United States Patent
Yamauchi

(10) Patent No.: US 8,553,247 B2
(45) Date of Patent: Oct. 8, 2013

(54) IMAGE PROCESSING APPARATUS, CONTROL METHOD, STORING MEDIUM HAVING COMPUTER-READABLE PROGRAM THEREIN, AND PROGRAM

(75) Inventor: Mitsugu Yamauchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1847 days.

(21) Appl. No.: 11/008,953

(22) Filed: Dec. 13, 2004

(65) Prior Publication Data

US 2005/0128519 A1    Jun. 16, 2005

(30) Foreign Application Priority Data

Dec. 15, 2003    (JP) ................................ 2003-416979

(51) Int. Cl.
G06F 15/00    (2006.01)

(52) U.S. Cl.
USPC ........................................ 358/1.15; 358/1.16

(58) Field of Classification Search
USPC ...................... 358/1.1, 1.15, 1.16, 3.26–3.32; 707/102; 709/221–222, 247; 400/88, 400/691, 962
See application file for complete search history.

(56) References Cited

U.S. PATENT DOCUMENTS

| | | | |
|---|---|---|---|
| 6,349,304 B1 * | 2/2002 | Boldt et al. | 707/102 |
| 6,801,340 B1 | 10/2004 | Endo | 358/403 |
| 6,916,128 B1 * | 7/2005 | Petteruti et al. | 400/88 |
| 7,190,471 B2 * | 3/2007 | Sandfort et al. | 358/1.14 |
| 2002/0083131 A1 * | 6/2002 | Machida | 709/203 |
| 2009/0094164 A1 * | 4/2009 | Fontaine et al. | 705/67 |

FOREIGN PATENT DOCUMENTS

| | | |
|---|---|---|
| CN | 1224200 A | 7/1999 |
| CN | 1261698 A | 8/2000 |
| JP | 7-160441 | 6/1995 |
| JP | 2002-251347 | 9/2002 |
| JP | 2002-259089 | 9/2002 |
| JP | 2003-6134 | 1/2003 |

* cited by examiner

Primary Examiner — King Poon
Assistant Examiner — Iriana Cruz
(74) Attorney, Agent, or Firm — Fitzpatrick, Cella, Harper & Scinto

(57) ABSTRACT

In a data processing apparatus, it is an object to realize a mechanism for allowing a setup regarding an image processing apparatus to be made so as to easily execute a job which is requested from said data processing apparatus. Information including an output destination is inputted. Setup information regarding the setup of the own image processing apparatus is stored. The setup information regarding the setup of the own image processing apparatus is transmitted on the basis of the information which is inputted.

17 Claims, 12 Drawing Sheets

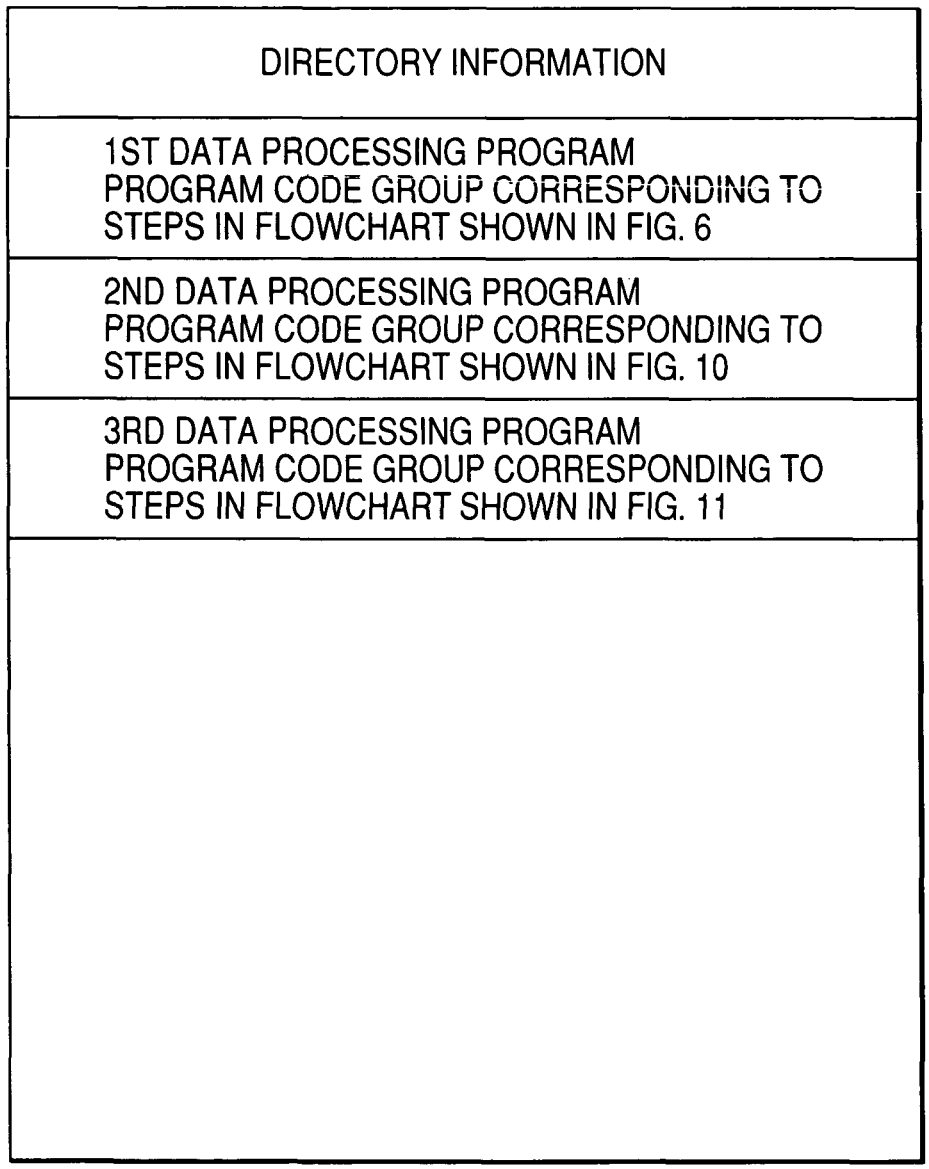

US 8,553,247 B2

IMAGE PROCESSING APPARATUS, CONTROL METHOD, STORING MEDIUM HAVING COMPUTER-READABLE PROGRAM THEREIN, AND PROGRAM

BACKGROUND OF THE INVENTION

1. Field of the Invention

The invention relates to a mechanism for allowing a setup regarding an image processing apparatus to be easily performed in a data processing apparatus.

2. Related Background Art

Hitherto, in a data processing apparatus, in the case of installing a printer driver to control a printer which operates under a network connection environment, the user installs the printer driver by downloading the printer driver onto his own PC from a server on a network, or the like. At this time, the user selects the printer driver on the basis of a model name of a printer which is used, a printer name, and the like and installs it.

In Japanese Patent Application Laid-Open No. 2002-259089, there has been disclosed a technique in which the user designates a printer of a type whose priority is raised as an access point or a server from a computer and the computer receives the printer driver and print settings corresponding to the designation.

In the conventional technique, however, there is such a problem that in the case where the model name of the printer is unknown or a correspondence between the printer existing in an actual physical location and the printer name is unknown, the user cannot understand which one of a plurality of kinds of printer drivers managed by the server should be selected and installed in order to use the target printer.

On the other hand, there has been pointed out such a problem on the operation that in the case where information regarding a network setup such as an IP address and the like of the printer is not included in the downloaded printer driver, the user has to set the network after he examined the information regarding the network setup by himself.

The invention is made in consideration of the above problem and it is an object of the invention to realize a mechanism for allowing a setup regarding an image processing apparatus to be easily performed in a data processing apparatus.

SUMMARY OF THE INVENTION

Accordingly, the present invention is conceived as a response to the above-described disadvantages of the conventional art.

According to one aspect of the present invention, preferably, there is provided an image processing apparatus of the invention which can communicate with a data processing apparatus through a network and executes a job which is requested from the data processing apparatus, comprising: input means for inputting information including an output destination; storing means for storing setup information regarding a setup of the image processing apparatus; and transmitting means for transmitting the setup information which is stored in the storing means on the basis of the information which is inputted through the input means, wherein the data processing apparatus can execute the setup based on the setup information and regarding the image processing apparatus.

Thus, it is possible to reduce such an operation that, in the data processing apparatus, the user is undecided whether to perform the setup to which image processing apparatus, or the like.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 12 is a diagram for explaining a memory map of a storing medium for storing various data processing programs which can be read out by the print system according to the invention.

DETAILED DESCRIPTION OF THE PREFERRED EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 1:
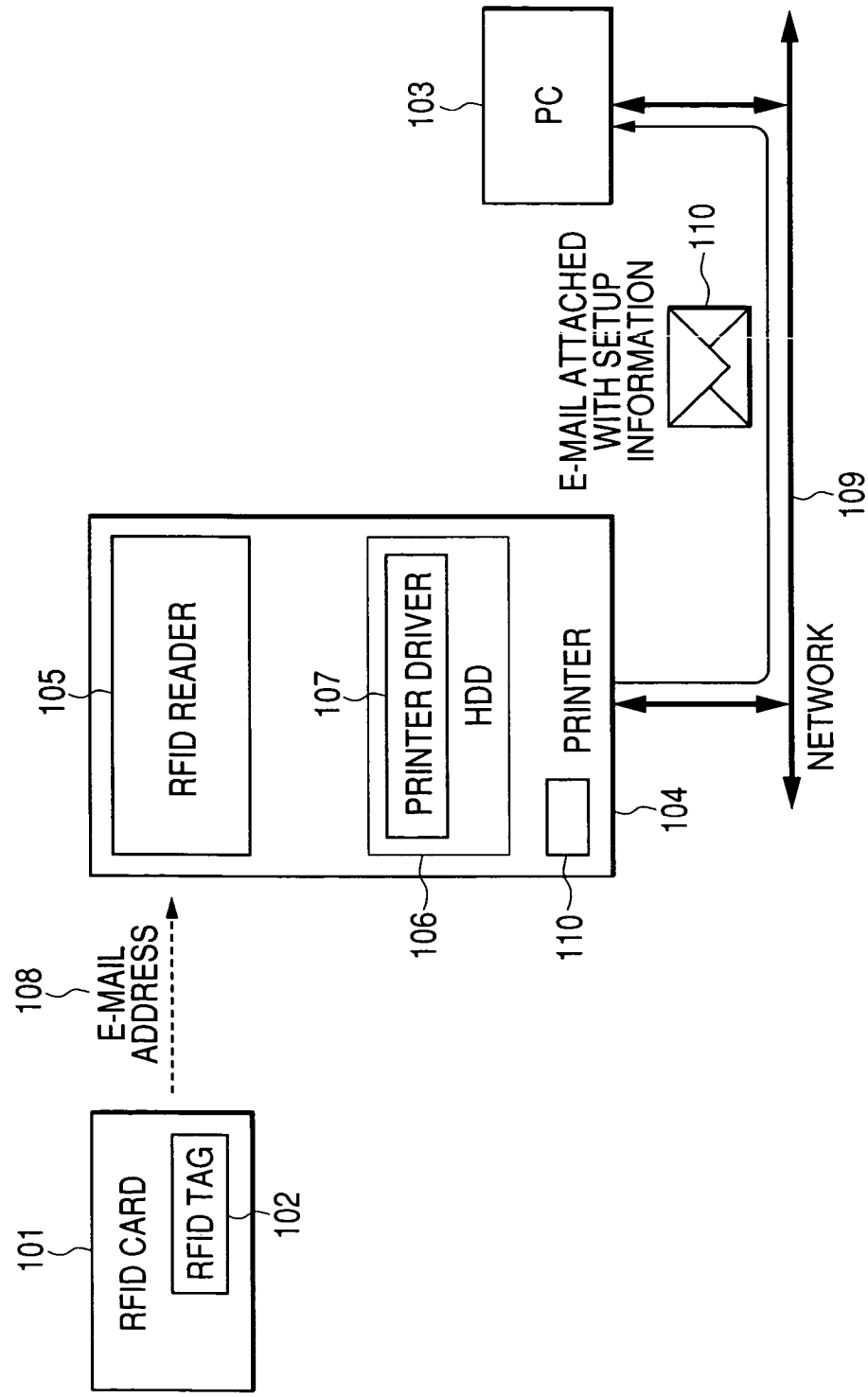
FIG. 1 is a block diagram showing an example of a print system showing the first embodiment of the invention.

FIG. 1 is a block diagram showing an example of a print system showing the first embodiment of the invention and corresponds to the example of the print system in which a printer and a PC (personal computer) can communicate through a network.

In FIG. 1, reference numeral 101 denotes an RFID card as an example of a portable device having at least a data communicating function and a tag serving as a storing unit. An RFID tag 102 (which will be explained in detail hereinafter) is provided in the RFID card. In the embodiment, the tag to store predetermined information is not limited to the RFID but various storing devices such as an IC chip and the like can be applied. The RFID will be explained as an example hereinbelow for simplicity of explanation. The portable device is not limited to the card but another device having a physical shape with a tag such as a wristwatch or the like can be properly applied. The RFID card with the RFID as a tag will be explained as an example hereinbelow for simplicity of explanation.

The RFID card 101 is an ID card which is individually carried by the user himself and has a function for personal authentication of the user. Reference numeral 103 denotes a personal computer (hereinafter, abbreviated to PC). The user executes various applications by the PC 103, thereby executing a data processing operation.

Reference numeral 104 denotes a printer which receives print information through a printer driver installed in the PC 103 and prints various documents whose printing is requested by the user onto a recording medium. Reference numeral 105 denotes an RFID reader which will be explained in detail hereinafter. Although it is shown as an RFID reader in the diagram, it is also possible to properly allow the RFID reader 105 to have a writing function, that is, a function of writing data and operate as writing means as necessary.

Reference numeral 106 denotes an HDD (hard disk drive) which is provided in the printer 104 and can temporarily store a job. The HDD 106 is constructed so that it can hold a user area called a box. Information for the printer driver itself and/or printer setting information of an output port monitor associated with the printer driver have been stored in the HDD 106, such as printer name, URL of the driver, IP address, MAC address, support communication protocol, and construction information showing option constructions such as stapler, and duplex unit. Reference numeral 107 denotes a printer driver which is exclusively used for the printer 104 and this driver has been stored in a predetermined area on the HDD 106. The setting information stored in the HDD can be included in the printer driver 107 or provided as another file.

Reference numeral 108 denotes an E-mail address as information showing an output destination at the time of transmitting, for example, setup information, which will be explained hereinafter, from the printer 104, that is, an E-mail address of the user who carries the RFID card 101. The E-mail address 108 is read out by the RFID reader 105 and stored into the printer 104. Such a processing step will be explained hereinafter. Although the first and second embodiments will be described on the assumption that the output destination of the information from the printer to an external PC is set to the E-mail address as an example, the output destination is not limited to the E-mail address. For instance, information such as path of a folder (storing location) which is shared and set in the PC 103, IP address of the PC 103, name in a DNS (Domain Name System) of the PC 103, or the like can be applied so long as it can specify a location where the information is outputted from the printer 104. When the setup information is transmitted to the output destination, a communicating protocol according to the designated output destination is used. For example, if the E-mail address is designated as an output destination, an E-mail protocol is used. If the folder is designated as an output destination, an ftp is used.

The PC 103 and the printer 104 are connected to a network 109. E-mail 110 attached with the printer driver 107 as setup information is transmitted to the E-mail address stored in the RFID card 101. For example, the setup information can be set to data in a file format in which it has been compressed by a predetermined compression system.

The printer driver 107 will now be described.

The printer driver 107 stored on the HDD 106 provided for the printer 104 is a printer driver corresponding to the type of printer 104. Further, as described in FIG. 1, a driver in which information regarding network setting such as an IP address and the like of the printer 104 on the network 109 has been preset is also stored as a printer driver 107 on the HDD 106. It is also possible to construct in such a manner that a printer driver main body and the setting information such as an IP address and the like in the setup of the printer driver are separated to different files and a compression file obtained by archiving the separated files is used as setup information.

Although the embodiment will be explained by using the name "printer driver" for convenience of explanation, naturally, an installer to install the printer driver 107 into the PC 103 or the like is included in the printer driver 107.

Figure 2:
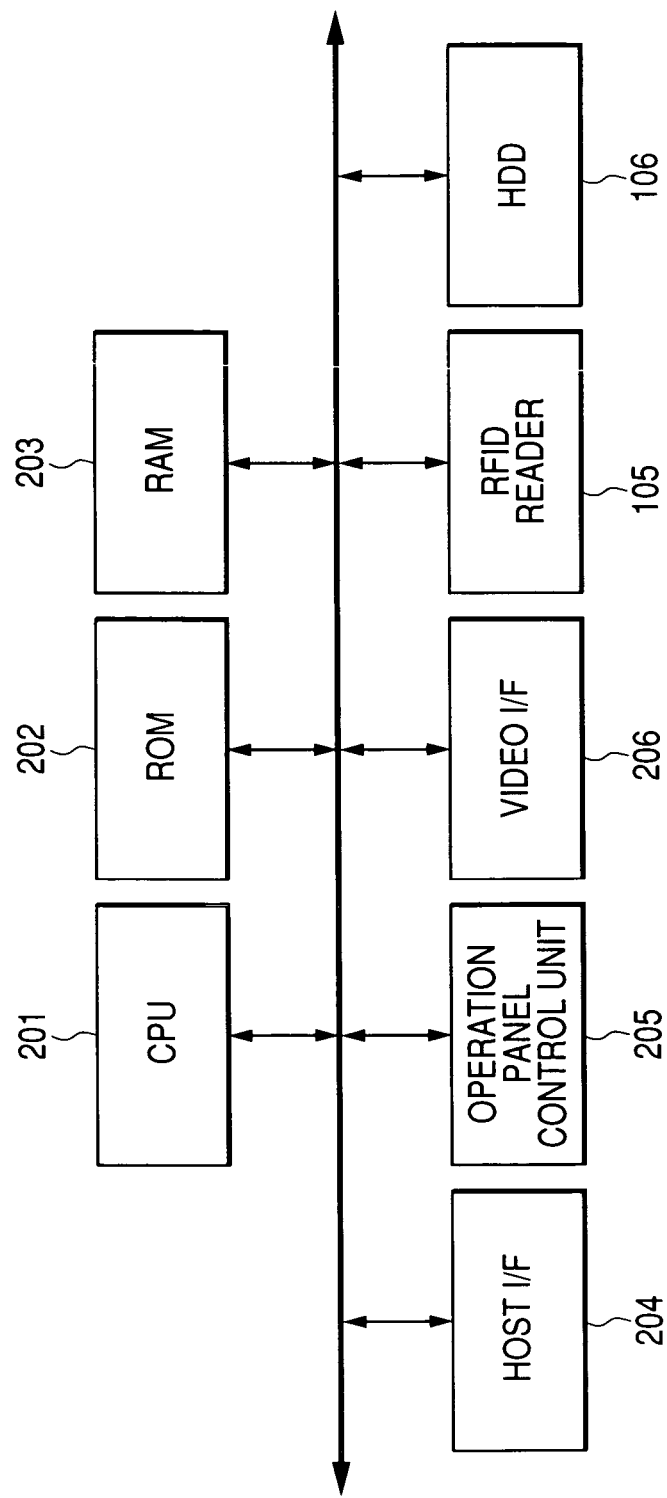
FIG. 2 is a block diagram for explaining a construction of a video controller for controlling a printer shown in FIG. 1.

FIG. 2 is a block diagram for explaining an example of a construction of a video controller (hereinafter, referred to as a controller) for controlling the printer 104 shown in FIG. 1 and the same component elements as those in FIG. 1 are designated by the same reference numerals.

In FIG. 2, reference numeral 201 denotes a CPU for reading out control programs stored in a ROM 202, storing them into a RAM 203, and controlling each unit of a printing apparatus on the basis of the control programs.

The control programs mentioned above and font data (printer font data) have been stored in the ROM 202. The RAM 203 is used as work memory area of the CPU 201, an area where image data to be printed is developed, and the like.

Reference numeral 204 denotes a host interface (host I/F) for receiving print data from the printer driver installed in the PC 103 shown in FIG. 1; 205 an operation panel control unit for controlling the input/output operation of an operation panel (constructed by, for example, an LCD, an LED, switches, and the like); and 206 a video I/F for forming an image signal to be printed and outputting it to a printer engine (not shown). The printer engine prints the print data onto a predetermined sheet on the basis of the image signal.

Reference numeral 105 in FIG. 2 denotes the same as the RFID reader 105 in FIG. 1. Similarly, reference numeral 106 in FIG. 2 denotes the same as the HDD in FIG. 1.

A recording method of the printer in FIG. 1 is not particularly limited. Therefore, a printer engine system in FIG. 2 is also not particularly limited. As a system of the printer engine, for example, various systems such as electrophotographic system, ink-jet system, thermal transfer system, and the like are applied. Therefore, printing apparatuses according to the various recording methods can be also applied as a printer in FIG. 1.

Figure 3:
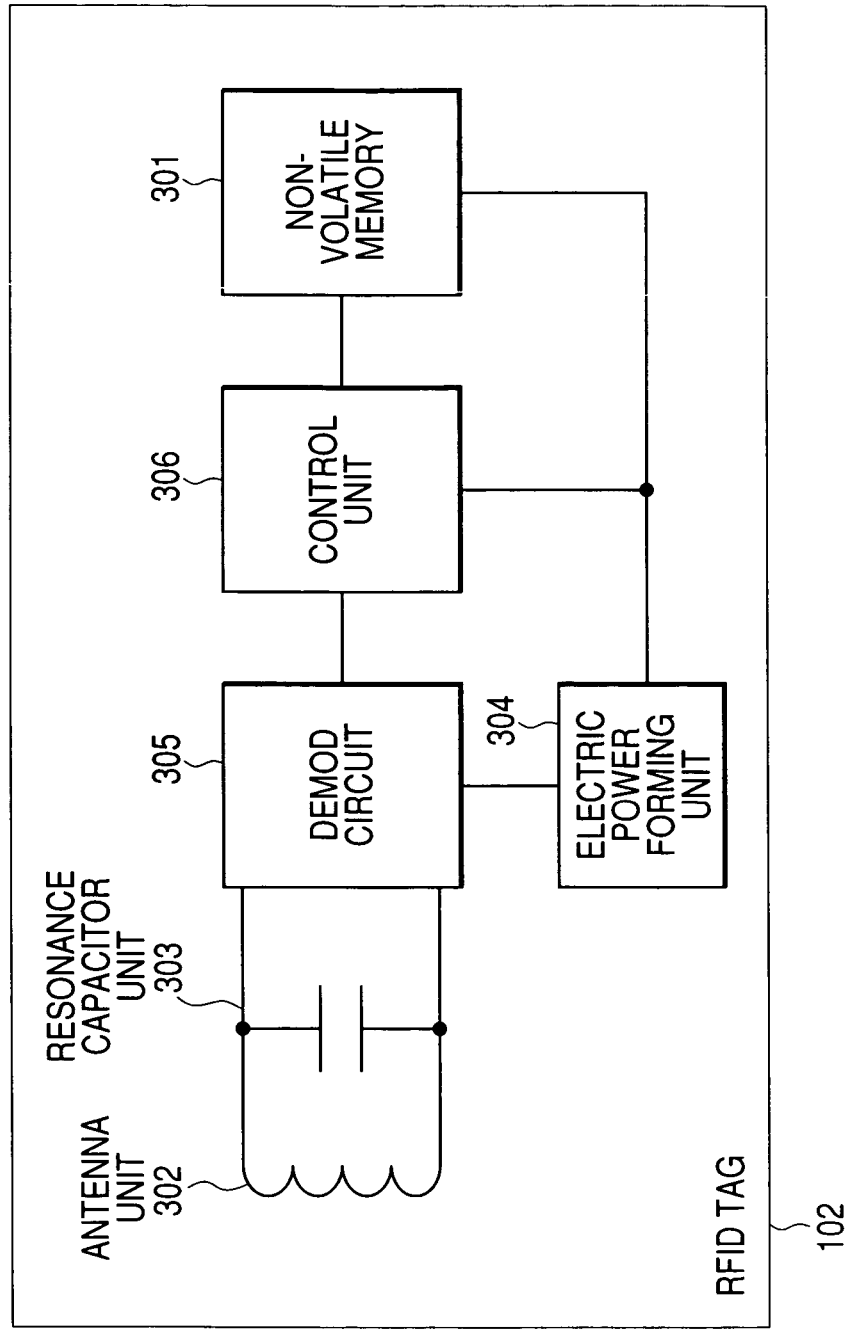
FIG. 3 is a block diagram for explaining a construction of an RFID tag shown in FIG. 1.

FIG. 3 is a block diagram for explaining a construction of the RFID tag 102 shown in FIG. 1.

In FIG. 3, the RFID tag 102 comprises: a non-volatile memory 301; an antenna unit 302 for transmitting/receiving a radio wave; a resonance capacitor unit 303; an electric power forming unit 304 for rectifying and smoothing a power source; a demodulating/modulating (DEMOD) circuit 305 for modulating and demodulating the radio wave; and a control unit 306.

The antenna unit 302 is combined with the resonance capacitor unit 303 and they can construct a resonance circuit. When a radio wave signal to supply the electric power is transmitted from the outside, the resonance circuit receives it and supplies it to the electric power forming unit 304.

The electric power forming unit 304 can supply the electric power for making the RFID tag 102 operative. The electric power is supplied to the non-volatile memory 301 and the DEMOD circuit 305. The control unit 306 is used to control an access to the RFID tag 102.

Data to be read out or written from/into the RFID tag 102 is also simultaneously transmitted or received together with the radio wave for supplying the electric power from the outside. The signal transmitted to the RFID tag 102 is demodulated by the DEMOD circuit 305 and written and stored into the non-volatile memory 301 through the control unit 306.

The data read out from the non-volatile memory 301 by the control unit 306 is modulated by the DEMOD circuit 305 and can be transmitted as a radio wave signal from the antenna unit 302.

Figure 4:
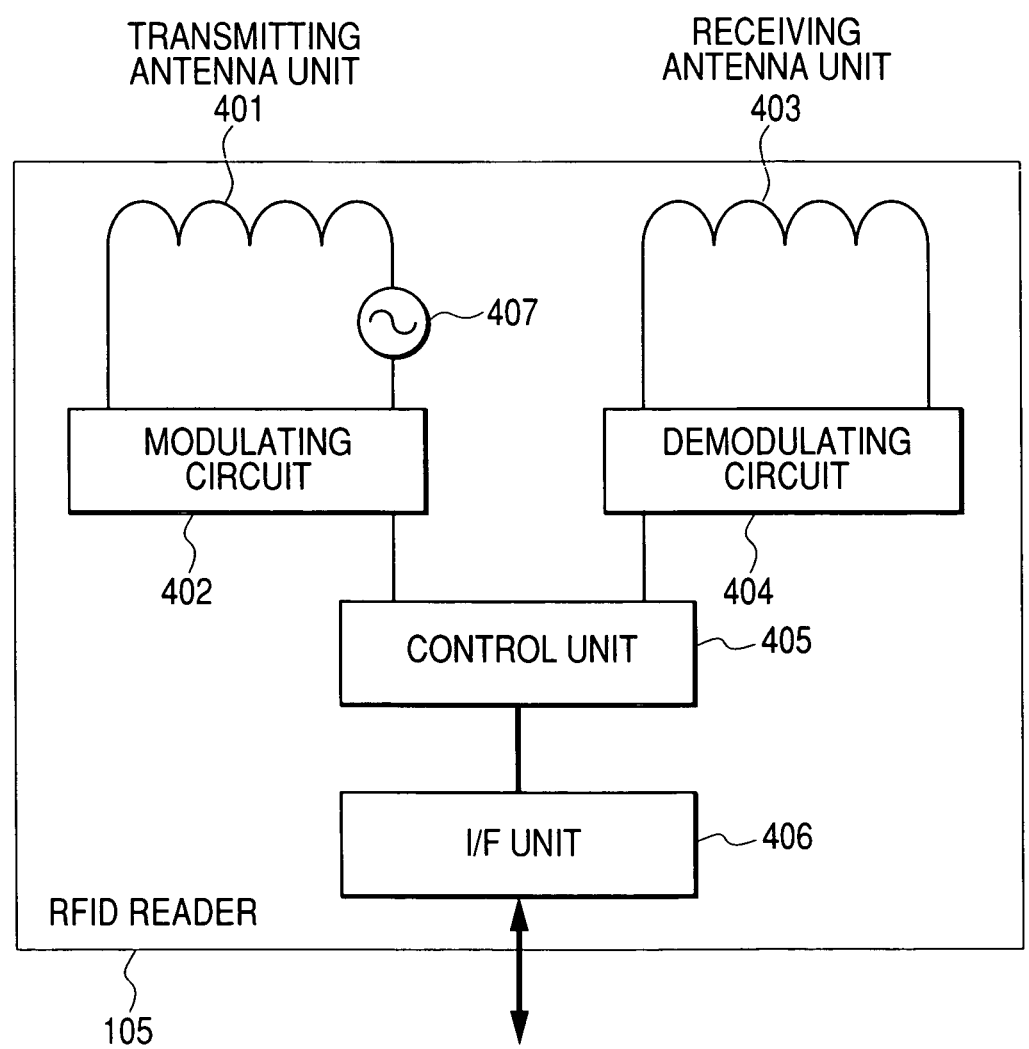
FIG. 4 is a block diagram for explaining a construction of an RFID reader in the printer shown in FIG. 1.

FIG. 4 is a block diagram for explaining a construction of the RFID reader 105 in the printer 104 shown in FIG. 1.

In FIG. 4, the RFID reader 105 comprises: a transmitting antenna unit 401 for transmitting the radio wave to the RFID tag 102; a modulating circuit 402 for modulating the radio wave transmitted from the transmitting antenna unit 401; a receiving antenna unit 403 for receiving the radio wave sent from the RFID tag 102; a demodulating circuit 404 for demodulating the signal received by the receiving antenna unit 403; a control unit 405 for controlling the modulating circuit 402 and the demodulating circuit 404; an interface unit (I/F unit) 406 for communicating with an upper apparatus; a power source 407 which is connected to the transmitting antenna unit 401 and supplies an electric power to the RFID tag 102; and the like.

In the RFID reader 105 constructed as mentioned above, the control unit 405 modulates the radio wave (hereinafter, referred to as a charge wave) for supplying the electric power and the data to be transmitted by using the modulating circuit 402 on the basis of an instruction from the outside and transmits the radio wave to the outside through the transmitting antenna unit 401. After the radio wave signal received from the outside is received by the receiving antenna unit 403 and demodulated by the demodulating circuit 404 and, thereafter, the signal can be converted so that it can be handled as a data signal.

Figure 5:
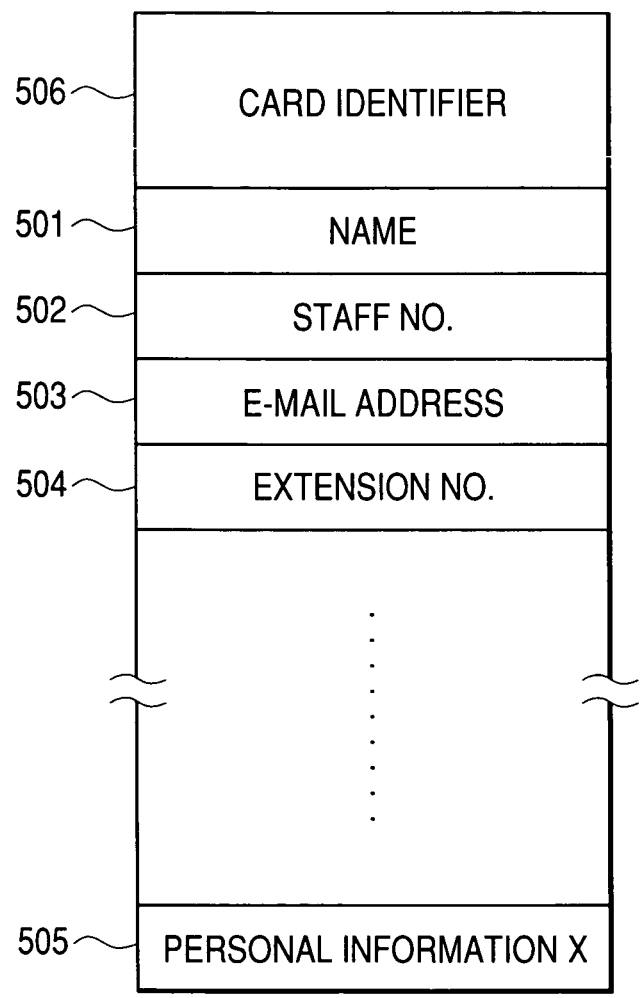
FIG. 5 is a diagram for explaining a part of contents of data in a non-volatile memory of the RFID tag provided in an RFID card shown in FIG. 1.

FIG. 5 is a diagram for explaining an example of contents of data in the non-volatile memory 301 of the RFID tag 102 provided in the RFID card 101 shown in FIG. 1.

As mentioned above, the RFID card 101 is an ID card which is individually carried by the user himself. The embodiment will be described on the assumption that the RFID card 101 is an ID card which is used in a company.

In FIG. 5, reference numeral 506 denotes a card identifier; 501 a name of the owner of the RFID card 101, that is, the user who always carries the RFID card 101; 502 a staff number of the user; 503 an E-mail address of the user; and 504 an extension number of the user. It is also assumed that information other than the information of the above items 501 to 504 has also been stored in the non-volatile memory 301 and various personal information of the user of up to personal information X (505) has also been stored. Each of the items shown in FIG. 5 is constructed by a format which has been predetermined between the card and the printer 104. The printer 104 can identify each item. For example, a storing area of each item can be predetermined between the RFID card and the printer 104 or it is also possible to construct in such a manner that an identifier of each item is preliminarily decided and the printer 104 is made to recognize the contents of each item on the basis of the item identifier.

The card identifier 506 will now be described in detail. The card identifier 506 shows identification information for allowing the printer 104 to identify a type of RFID card as a portable device. When the card identifier is read out by the RFID reader 105 of the printer 104, the card identifier is discriminated in the printer 104 and a menu is displayed as shown in FIG. 6B in accordance with a discrimination result. When the card identifier 506 cannot be identified, there is no need to display the menu. Although it is presumed that the RFIDs are attached to various articles, the printer 104 shifts to a predetermined process such as a menu display or the like when it discriminates the identifier registered in its own apparatus. When the card identifier 506 cannot be identified, the printer 104 does not execute an unnecessary process. A simple character train can be applied to the card identifier 506 or authentication information subjected to further advanced encryption can be also used.

Figure 6A:
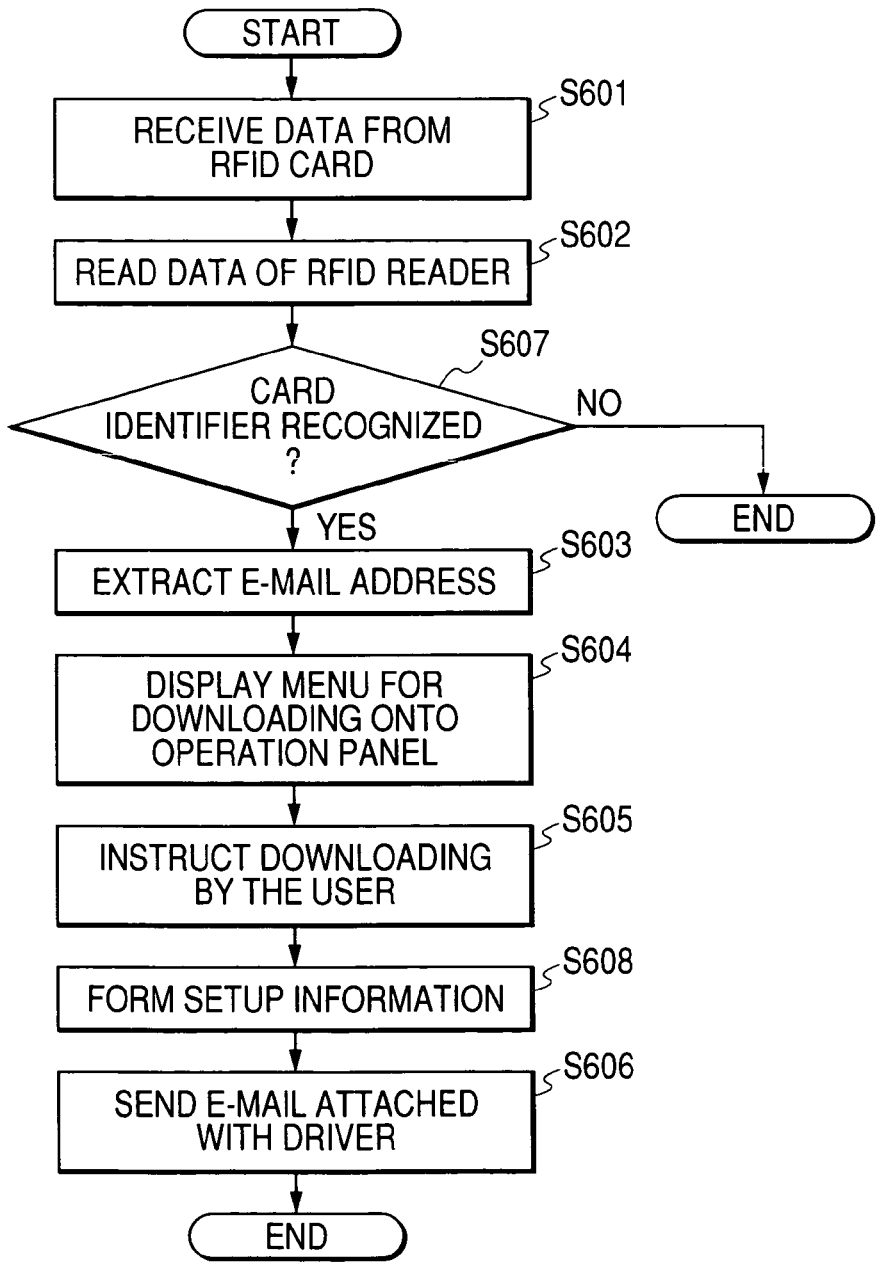
FIGS. 6A and 6B are flowcharts showing an example of a first data processing procedure in the print system according to the invention.
Figure 6B:
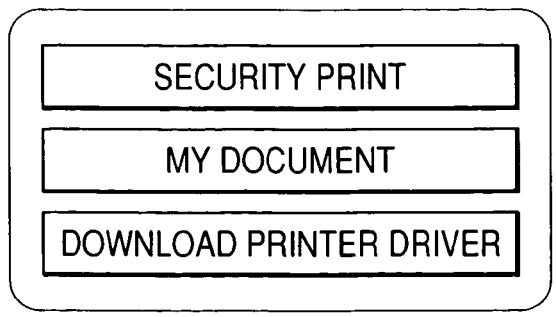

FIG. 6A is a flowchart showing an example of a first data processing procedure in the print system according to the invention and corresponds to the process in which the CPU 201 transmits the printer driver selected from the HDD 106 in accordance with the information read out by the RFID reader 105 to the PC 103 by E-mail from the printer 104 through the host I/F 204. (S601) to (S606) denote processing steps.

If the user newly wants to use the printer 104 (for example, in the case where the printer 104 is newly provided or where it is necessary to use another printer different from the printer which has been used so far), he goes to the place where the printer 104 has been set and holds the RFID card 101 as a portable device over the RFID reader 105 in the printer 104. The RFID reader 105 receives the data in the non-volatile memory 301 of the RFID tag 102 in the held RFID card 101 by the receiving antenna unit 403 (601).

The data transmission and reception between the RFID tag 102 and the RFID reader 105 mentioned above will now be described in detail with reference to FIGS. 3 and 4.

The charge waves are transmitted at predetermined intervals from the transmitting antenna unit 401 of the RFID reader 105. When the user holds the RFID card 101 over the RFID reader 105, the RFID tag 102 on the RFID card 101 receives the charge waves by the resonance circuit constructed by the antenna unit 302 and the resonance capacitor unit 303. The electric power forming unit 304 can supply the electric power for making the RFID tag 102 operative.

The RFID tag 102 which obtained the sufficient electric power reads out the data from the non-volatile memory 301 by the control unit 306, modulates the data by the DEMOD circuit 305, and transmits the modulated data as a radio wave signal from the antenna unit 302. Thus, a response signal from the RFID tag 102 is detected in the RFID reader 105 and the data in the non-volatile memory 301 converted into the radio wave signal is received by the RFID reader 105.

Specifically speaking, after the radio wave signal is received by the receiving antenna unit 403 and demodulated by the demodulating circuit 404, it is converted into a signal which can be handled as a data signal. The demodulated data can be read out by the CPU 201 shown in FIG. 2 through the I/F unit 406.

After that, the RFID reader 105 causes interruption to the CPU 201. The CPU 201 reads out the data in the non-volatile memory 301 received by the RFID reader 105 and stores it into the RAM 203. As mentioned above, the data in the non-volatile memory 301 includes the name 501, staff number 502, E-mail address 503, extension number 504, and the like of the user as an owner of the RFID card 101.

By the interruption, the CPU 201 detects that the user held the RFID card 101 over the printer 104 and discriminates in the read information whether or not the card identifier 506 which can be recognized by its own apparatus could be identified (S607). If the presumed card identifier could be identified, the processing routine advances to step S603. If the predetermined identifier cannot be discriminated in the process of step S607, the processing routine of the flowchart of FIG. 6A is finished.

The E-mail address 503 is extracted from the various personal information in the RAM 203 (603). As described in FIG. 5 also, each item is constructed by the format which has been predetermined between the card and the printer 104 and the printer 104 can discriminate each item. The printer 104 extracts the E-mail address as an output destination of the setup information from each item in FIG. 5 in accordance with a predetermined rule. The identification information which is read out from the tag (RFID) as a condition for displaying a menu of FIG. 6B can be previously registered into the printer. A process for discriminating whether or not the menu of FIG. 6B is displayed in accordance with whether or not the registered identification information has been read out can be customized by the user.

After that, a menu for downloading the printer driver as shown in FIG. 6B is displayed onto the operation panel of the printer 104 by the operation panel control unit 205 (S604). FIG. 6B shows the setting display screen information which has previously been held in the storing unit of the printer 104. The user can instruct a desired operation from the menu displayed by display control means of the printer 104. In the embodiment, it is assumed that "download printer driver" in FIG. 6B is selected and the user can execute the downloading of the printer driver of the printer 104 by the operation panel.

Therefore, the user instructs the downloading of the printer driver by properly operating the operation panel (S605). By receiving such an instruction, the setup information is formed by the printer 104. This setup information corresponds to the printer driver 107 and comprises printer driver main body for forming the print date and information for the printer driver itself, and/or printer setting information of the output port monitor associated with the printer driver, such as printer name of the printer 104, URL of the driver, IP address, MAC address, support communication protocol, and construction information showing option constructions such as stapler, and duplex unit. A program for an installer to set the printer driver into the PC 103 is also included in the printer driver 107. In the PC 103 (data processing apparatus), the setup of the printer 104 is performed in accordance with the setup information including the printer driver main body, the printer setting information, and the installer. Further, if the printer driver main body has already been stored in the PC that is used by the user, the setup information excluding the printer driver main body can be also provided from the printer to the PC.

The CPU 201 in the printer 104 forms E-mail attached with the printer driver 107 (the setup information) on the HDD 106 in response to the E-mail address 503 as an extracted output destination and transmits the E-mail 110 attached with the printer driver through the host I/F 204 (S606). The processing routine is finished.

Thus, even in the user who does not know the printer name, IP address, and the like on the network, the user who newly tried to use the printer 104, that is, the user who executed the simple operation for simply holding the RFID card 101 possessed by himself over the RFID reader 105 in the printer 104 returns to the place of his own PC 103 and receives the E-mail after that. Since the E-mail 110 attached with the printer driver mentioned above is received by the PC 103, the user activates the installer added to the attached printer driver 107 and installs it to an external storing apparatus of the PC 103.

After the installation, the print settings such as printer name, IP address, and the like are automatically set in the printer driver. In this state, when the user activates various applications on the PC 103 and makes a print request, the installed printer driver forms the print information that is optimum to the printer 104 on the network and transmits it. The printer 104 can freely print various documents or the like.

As described above with reference to FIGS. 1 to 6A and 6B, in the first embodiment of the invention, since the RFID reader 105 is provided for the printer 104 and, further, the printer driver 107 for the printer 104 is stored onto the HDD, the E-mail address 503 as an output destination can be obtained from the personal information on the RFID tag 102 in the RFID card 101 which is carried by the user.

Moreover, by transmitting the E-mail attached with the setup information to the obtained E-mail address 503, the user can use the printer 104 merely by instructing the installation on the basis of the printer driver 107 received by the PC 103. Even if the user does not know the model name of the printer 104 or does not perform the network-setting of the IP address and the like, he can use the printer 104, so that the printer driver can be easily installed.

When the setup information is requested through the menu display, it is sufficient to form the setup information regarding his own apparatus. The printer 104 can form the setup information including the printer driver and the setting information necessary for setting the output port monitor, provide it to the designated output destination, and provide the information that is very useful for the user.

In the embodiment, the printer driver on the HDD is transmitted to the E-mail address of the user.

However, an effect similar to that in the embodiment is obtained even by such a construction that a printer driver which is used for the printer and in which the network settings have been preset is provided for the server on the network, a URL or the like showing the location of the printer driver is transmitted by E-mail to the E-mail address of the user, and the user downloads the printer driver from the URL.

Second Embodiment

The first embodiment has been described above with respect to the case where the printer 104 reads out the information stored in the tag (RFID card 101) attached to the portable device, the printer 104 itself forms the E-mail to the PC address of the person who owns the RFID card 101, the printer driver is attached to the E-mail and transmitted, and the transmitted printer driver is installed. However, it is also possible that the print system has a reading/writing function (reader/writer) function for transferring the printer information to install the printer driver from the printer into the RFID card and reading/writing it from/into the RFID card 101 on the PC side, the printer information obtained from the printer is read out and stored once into the PC of the user and, thereafter, the corresponding printer driver is downloaded from a driver management database of the printer server by the PC and installed to the PC of the user. Such an embodiment will be described hereinbelow.

Although the second embodiment will be described with respect to the case where, for example, the RFID card is used as a portable device and the RFID is used as a tag, it is not limited to such an example in a manner similar to the first embodiment.

Figure 7:
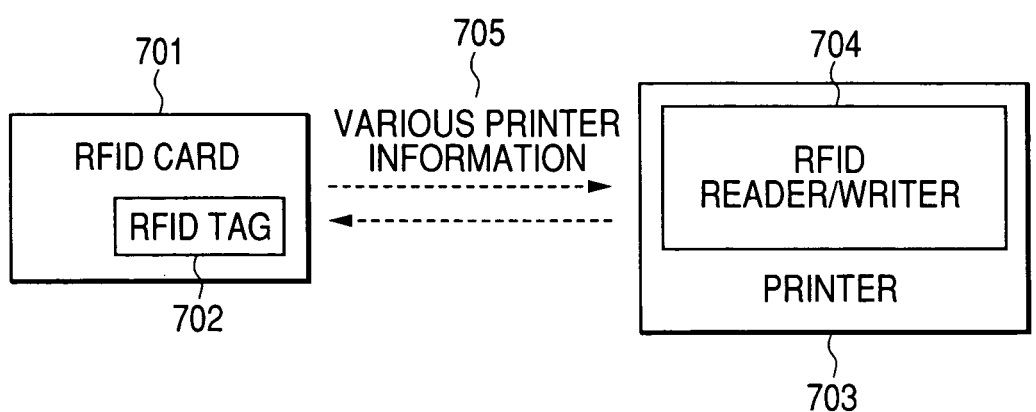
FIG. 7 is a block diagram for explaining a construction of a print system showing the second embodiment of the invention.

FIG. 7 is a block diagram for explaining a construction of a print system showing the second embodiment of the invention.

In FIG. 7, reference numeral 701 denotes an RFID card having an RFID tag 702 (which will be explained in detail hereinafter) therein.

The RFID card 701 is an ID card which is individually carried by the user himself and also has a function for personal authentication of the user. Reference numeral 703 denotes a printer for printing various documents of the user. For simplicity of explanation, the name of the printer 703 on the network is assumed to be "printer_D".

Reference numeral 704 denotes an RFID reader/writer which will be explained in detail hereinafter. Reference numeral 705 denotes various printer information which is transmitted and received between the RFID reader/writer 704 and the RFID tag 702 on the RFID card 701. Contents of the various printer information and its transmitting/receiving step will now be described in detail hereinafter.

A construction of a video controller (hereinafter, referred to as a controller) for controlling the printer 703 is almost the same as that in the first embodiment. The controller in the second embodiment is constructed by replacing the RFID reader 105 in FIG. 2 with an RFID reader/writer.

It is assumed that a construction of the RFID tag 702 has the construction shown in FIG. 3 in the first embodiment. It is assumed that a construction of the RFID reader/writer 704 has the construction shown in FIG. 4 in the first embodiment.

Figure 8:
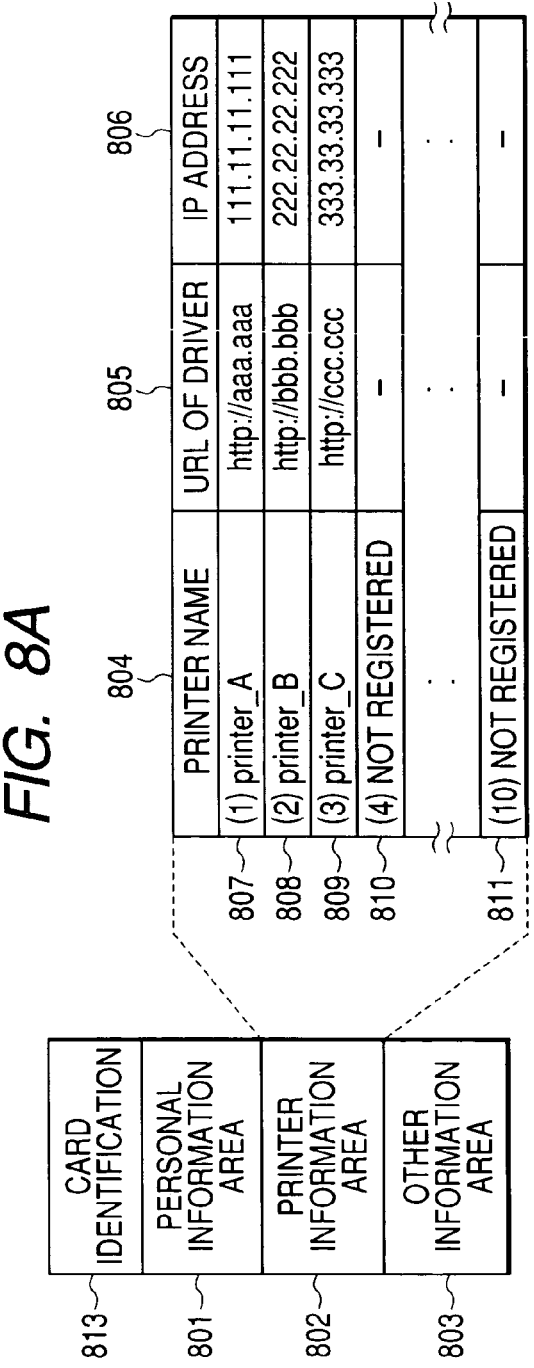
FIGS. 8A and 8B are diagrams for explaining a part of contents of data in a non-volatile memory of an RFID tag provided in an RFID card shown in FIG. 7.

FIGS. 8A and 8B are diagrams for explaining an example of contents of data in the non-volatile memory 301 of the RFID tag 702 provided in the RFID card 701 shown in FIG. 7.

As mentioned above, the RFID card 701 is the ID card which is individually carried by the user himself.

In FIG. 8A, reference numeral 801 denotes a personal information area in which various personal information of the owner of the RFID card 701 has been stored. The various personal information denotes, for example, the name, staff number, E-mail address, and the like in a manner similar to those in the first embodiment. Reference numeral 802 denotes a printer information area which will be explained in detail hereinafter. Reference numeral 803 denotes another information area in which information other than the various personal information and the printer information is stored.

A format of the printer information area 802 includes a printer name 804, a URL 805 of the driver, and an IP address 806. Total ten (the halfway is omitted) data of data 807 to 811 can be stored. Details of each data will be explained hereinafter. The state where the printer information (1) to (3) have already been registered is shown here.

In FIG. 8A, the data 807 of the item of the printer name 804 is "printer_A".

The data area 807 of the item of the URL 805 of the driver is "http://aaa.aaa". The URL of the driver is a URL showing a location of the printer driver for the printer name "printer_A" on a printer driver DB 905 of a server 904. The data of the item of the IP address is "111.11.11.111". It shows the IP address of "printer_A" on the network. Although not shown, in a manner similar to the first embodiment, the information for the printer driver itself and/or the printer setting information of the output port monitor associated with the printer driver can be also included in the printer information area 802 other than the areas 804 to 806, such as printer name, URL of the driver, IP address, MAC address, support communication protocol, and construction information showing option constructions such as stapler, and duplex unit.

Similarly, a printer name "printer_B", a URL "http://bbb.bbb" indicative of the place of the printer driver "printer_B", and an IP address "222.22.22.222" of "printer_B" on the network have been stored in the data area 808.

Similarly, a printer name "printer_C", a URL "http://ccc.ccc" indicative of the place of the printer driver "printer_C", and an IP address "333.33.33.333" of "printer_C" on the network have been stored in the data area 809.

No data is registered in the data areas 810 to 811. Various information of the printer can be registered in a manner similar to those in the data areas 807 to 809.

FIG. 8B corresponds to the state where new printer information (4) has been written by the RFID reader/writer 704 of the printer 703 from the state shown in FIG. 8A. The data 812 will be described hereinafter.

Figure 9:
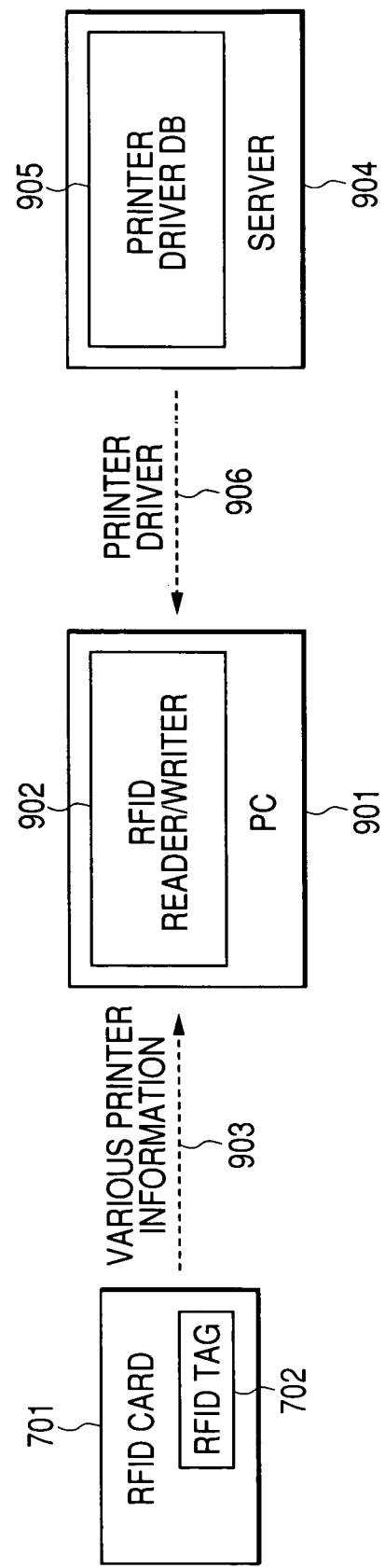
FIG. 9 is a block diagram for explaining a construction of the print system showing the second embodiment of the invention.

FIG. 9 is a block diagram for explaining a construction of the print system showing the second embodiment of the invention and the same component elements as those in FIG. 7 are designated by the same reference numerals.

In FIG. 9, reference numeral 901 denotes a PC which is used by the user who owns the RFID card 701 and connected to a network. An RFID reader/writer 902 is provided for the PC 901 and operates in a manner similar to that of the RFID reader/writer 704 shown in FIG. 7.

Reference numeral 903 denotes various printer information which is read out from the RFID tan 702 on the RFID card 701 by the RFID reader/writer 902. This processing step will be explained hereinafter. Reference numeral 904 denotes the server on the network. The server 904 unitarily manages the printer drivers by the printer driver database (hereinafter, referred to as a printer driver DB) 905. Reference numeral 906 denotes a printer driver which is downloaded from the server 904 by the PC 901. Processes which are executed until the installation after the printer driver was obtained will be explained hereinafter.

First, details of each data in the printer information area 802 in FIGS. 8A and 8B will be described with respect to the data 807 shown in FIGS. 8A and 8B as an example.

Figure 10:
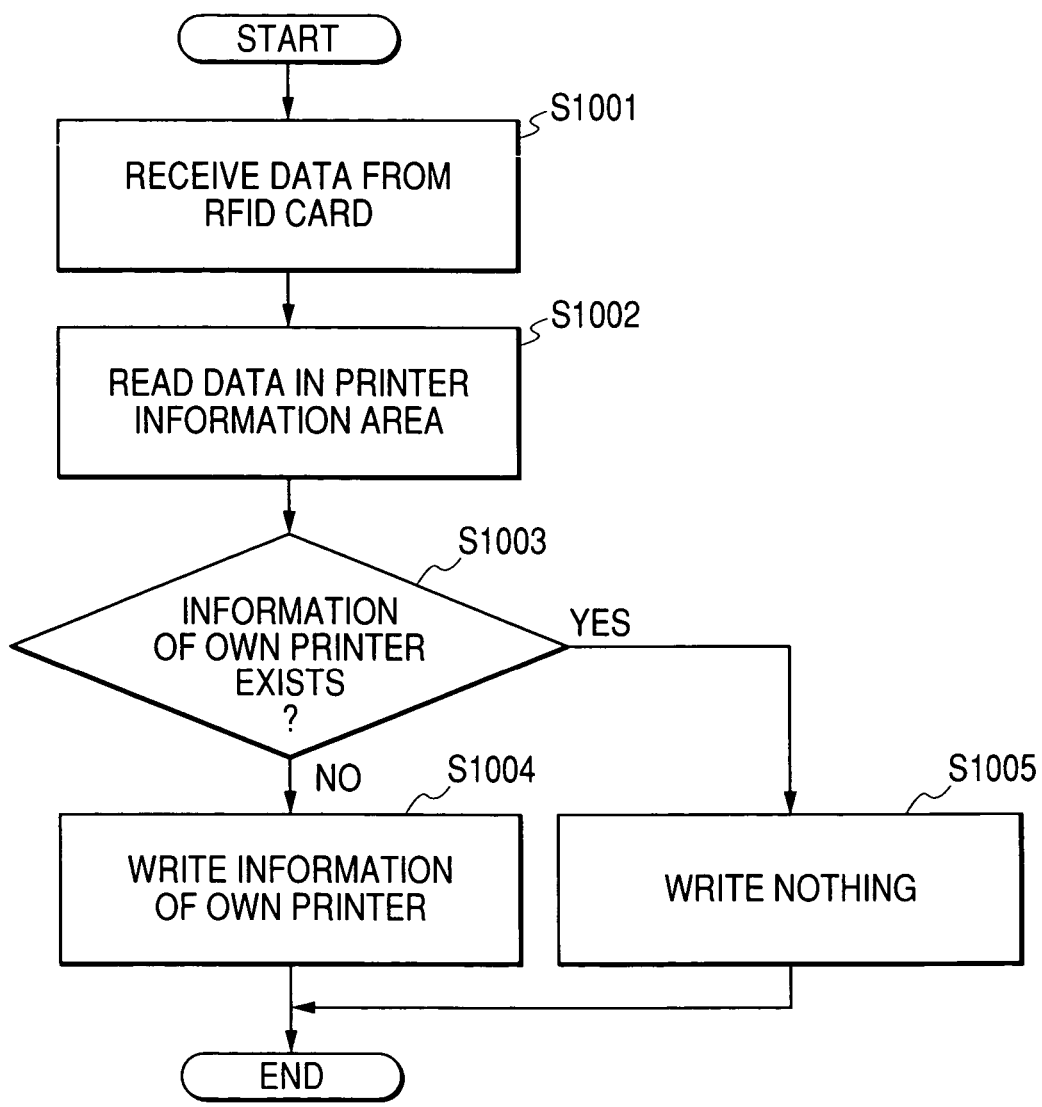
FIG. 10 is a flowchart showing an example of a second data processing procedure in the print system according to the invention.

FIG. 10 is a flowchart showing an example of a second data processing procedure in the print system according to the invention and corresponds to the data processing procedure by the CPU in the printer 703. S1001 to S1005 denote processing steps, respectively.

When the user newly wants to use the printer 703 (for example, in the case where the printer 703 is newly provided or where there is a necessity to use another printer different from the printer which has been used so far), he goes to the place where the printer 703 has been set and holds the carrying RFID card 701 over the RFID reader/writer 704 of the printer 703. The RFID reader/writer 704 receives the data in the non-volatile memory 301 of the RFID tag 102 in the held RFID card 701 (S1001).

In a manner similar to the first embodiment, in the information read out in step S1001, whether or not a card identifier 813 which can be recognized by its own apparatus could be identified is discriminates. If the presumed card identifier could be identified, the processing routine advances to step S1002. If the identifier which has previously been registered cannot be recognized, the processing routine of the flowchart of FIG. 10 is finished.

Subsequently, the operation in the data transmission and reception between the RFID tag 702 and the RFID reader/writer 704 is similar to that described with reference to FIGS. 3 and 4 in the first embodiment. Thus, in the RFID reader/writer 704, the data in the personal information area 801, the data in the printer information area 802, and the data in the other information area 803 mentioned above are received.

The various printer information 705 (including the data in the printer information area 802) in FIG. 7 is transmitted from the RFID tag 702 to the RFID reader/writer 704.

After that, the RFID reader/writer 704 causes interruption to the CPU 201. The CPU 201 reads out the data in the printer information area 802 from the data received by the RFID reader/writer 704 (S1002) and stores it into the RAM 203.

Subsequently, the CPU 201 discriminates whether or not the information of its own printer exists in the data stored in the RAM 203 (S1003).

The data of the URLs 805 of the drivers in which, for example, the printer names 804 shown in FIGS. 8A and 8B is set to "printer_A", "printer_B", and "printer_C" and the data of the IP addresses 806 have been stored in the RAM 203.

Since the printer name of the printer 703 on the network is "printer_D" as mentioned above, if the printer name of the printer 703 is "printer_D", the information of "printer_D" is not stored in the RAM 203.

Therefore, in step S1003, the CPU 201 determines that "there is no information of own printer". In other words, it is determined that the information of the printer 703 whose printer name is "printer_D" is not stored on the RFID tag 702 in the RFID card 701.

In this case, the CPU 201 writes the printer name "printer_D", the URL showing the location of the printer driver of "printer_D", and the IP address of "printer_D" into the non-volatile memory 301 on the RFID tag 702 in the RFID card 701 through the RFID reader/writer 704 (S1004) and finishes the process.

Specifically speaking, in such a writing process, in FIG. 4, the data of the information of its own printer is inputted from the I/F unit 406, the control unit 405 modulates the radio wave for supplying the electric power and the data of the information of its own printer by using the modulating circuit 402 and transmits the radio wave to the outside from the transmitting antenna unit 401.

In the RFID tag 702 of the RFID card 701 in FIG. 3, the radio wave for supplying the electric power and the radio wave of the information of its own printer are received from the antenna unit 302, demodulated by the DEMOD circuit 305, and written into the non-volatile memory 301 through the control unit 306. Thus, as shown in FIG. 8B, the various printer information of the printer 703, that is, the printer name "printer_D", the URL showing the location of the printer driver of "printer_D", and the IP address of "printer_D" are stored into the area of 812 in the printer information area 802, respectively.

It is assumed that the URL showing the location of the printer driver of "printer_D" is "http://ddd.ddd" and the IP address is "444.44.44.444".

For example, the case where the printer name of the printer 703 is "printer_A" instead of "printer_D" will now be described.

In this case, in the discrimination about whether or not the information of its own printer exists in the data stored in the RAM 203 in step S1003 shown in FIG. 10, since the information of "printer_A" has already been stored in the RAM 203, the CPU 201 determines that "there is information of its own printer".

In other words, it is determined that the information of the printer 703 whose printer name is "printer_A" has been stored on the RFID tag 702 in the RFID card 701. In this case, nothing is written into the non-volatile memory 301 of the RFID tag 702 (S1005) and the processing routine is finished.

Thus, the user goes to the place where the printer 703 has been set and holds the carrying RFID card 701 over the RFID reader/writer 704 of the printer 703, so that the operation as mentioned above is executed. After that, the user returns to the place of its own PC 901 and subsequently holds the carrying RFID card 701 over the RFID reader/writer 902 provided for the PC 901, so that a processing routine shown in FIG. 11 is started.

Figure 11:
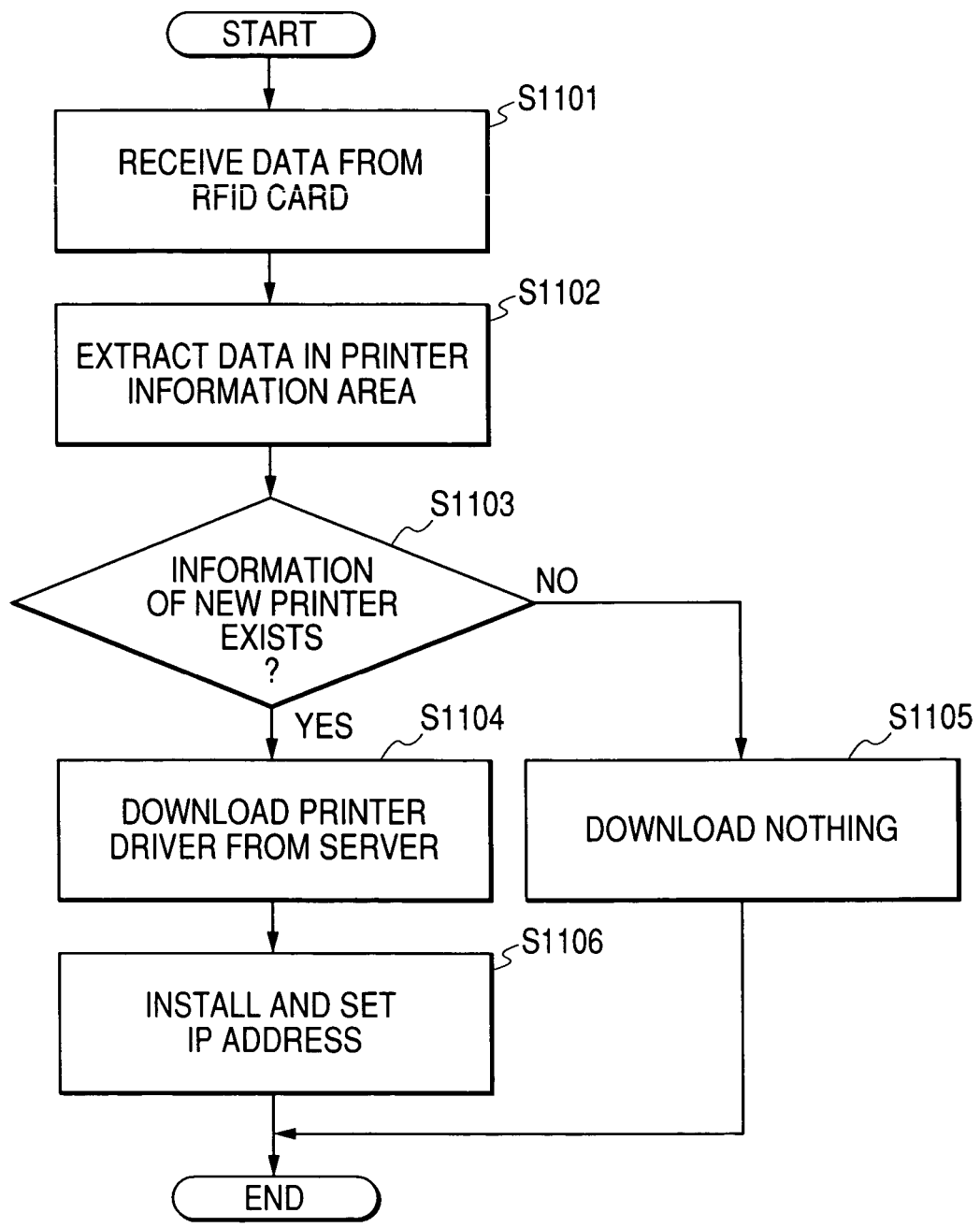
FIG. 11 is a flowchart showing an example of a third data processing procedure in the print system according to the invention.

FIG. 11 is a flowchart showing an example of a third data processing procedure in the print system according to the invention and corresponds to the data processing procedure by the CPU in the PC 901. S1101 to S1106 denote processing steps, respectively.

First, the RFID reader/writer 902 of the PC 901 receives the data in the non-volatile memory 301 of the RFID tag 702 in the RFID card 701 held by the user (S1101). Thus, the data in the personal information area 801, the data in the printer information area 802, and the data in the other information area 803 are received.

The various printer information 903 in FIG. 9 shows the data in the printer information area 802 which is transmitted from the RFID tag 702 to the RFID reader/writer 902 of the PC 901.

After that, the PC 901 extracts the data in the printer information area from the received data (S1102). Thus, the information of "printer_A", "printer_B", "printer_C", and "printer_D" shown in FIG. 8B is obtained.

Subsequently, the PC 901 discriminates whether or not information of the new printer exists in the extracted information in the printer information area (S1103).

Specifically speaking, the PC 901 has an area for storing the information of the usable printer on its own memory (not shown) and compares the printer information in this area with the extracted information in the printer information area, thereby making the above discrimination.

For example, assuming that the printer drivers of "printer_A", "printer_B", and "printer_C" have already been installed in the PC 901 and three printers can be used, the printer information of "printer_A", "printer_B", and "printer_C" has already existed on the memory of the PC 901.

Since the information of "printer_A", "printer_B", "printer_C", and "printer_D" exists in the extracted information, it is determined that the printer whose name is "printer_D" is the new printer. That is, it is determined that the information of the new printer exists in the extracted information in the printer information area.

If it is determined that the information of the new printer exists, the PC 901 accesses the URL of the driver of "printer_D", that is, the URL "http://ddd.ddd" showing the location of the printer driver of "printer_D" in the printer driver DB 905 on the server 904 and downloads the printer driver 906 as setup information of "printer_D" (S1104). Since the setup information is fundamentally similar to that described in the first embodiment, its detailed explanation is omitted.

Although the embodiment will be described on the assumption that the name "printer driver" is used for convenience of explanation, naturally, the installer of the printer driver 107 is included in the printer driver 906.

After the printer driver 906 of "printer_D" was downloaded, the PC 901 installs it. At this time, the PC makes the setting of the IP address "444.44.44.444" of "printer_D" (S1106) and finishes the process.

If it is determined in step S1103 that the information of the new printer does not exist in the extracted information in the printer information area, nothing is downloaded (S1105) and the processing routine is finished.

After that, the user can print various documents through the printer driver of "printer_D", that is, the printer driver corresponding to the printer 703.

As described above, according to the second embodiment, by providing the RFID reader/writer 704 for the printer 703 and further providing the RFID reader/writer 902 for the PC 901, the PC 901 can obtain the URL showing the location of the printer driver for the printer 703 through the RFID tag 702 on the RFID card 701 and the IP address of the printer 703.

Further, the PC 901 downloads the printer driver for the printer 703 from the obtained URL of the printer driver DB 905 on the server 904 and can set the obtained IP address of the printer 703 into the printer driver. Since the user can use the printer 703 even if he does not know the printer name and the IP address of the printer 703, the printer driver can be easily installed.

According to the embodiment, the printer driver installing method in which the selection and setup of the printer driver by the user are simplified can be provided.

A construction of a data processing program which can be read out by the image processing system according to the invention will be described hereinbelow with reference to a memory map shown in FIG. 12.

FIG. 12 is a diagram for explaining the memory map of the storing medium for storing the various data processing programs which can be read out by the image processing system according to the invention.

Although not shown, information for managing a program group which is stored in the storing medium, for example, version information, implementors, and the like are also stored and there is also a case where information depending on the OS or the like on the program reading side, for example, icons or the like to identify and display the programs are stored.

Further, the data belonging to the various programs is also managed in the directory. There is also a case where a program for installing the various programs into the computer and, if the installing program has been compressed, a program for decompressing it or the like is also stored.

The functions shown in FIGS. 6A, 6B, 10, and 11 in the embodiment can be also executed by a host computer in accordance with a program which is installed from the outside. In such a case, the invention is also applied to the case where the information group including the programs is supplied to an outputting apparatus by a storing medium such as CD-ROM, flash memory, FD, or the like or from an external storing medium through the network.

Naturally, as mentioned above, the object of the invention is also accomplished by a method whereby a storing medium in which program codes of software to realize the functions of the embodiments mentioned above have been recorded is supplied to a system or an apparatus and a computer (or a CPU or an MPU) of the system or apparatus reads out the program codes stored in the storing medium and executes them.

In this case, the program codes themselves read out from the storing medium realize the novel functions of the invention and the storing medium in which the program codes have been stored constructs the invention.

Therefore, the format of the program is not limited and any of an object code, a program which is executed by an interrupter, scrip data which is supplied to the OS, and the like can be used so long as they have the functions of the program.

As a storing medium for supplying the program, for example, a flexible disk, a hard disk, an optical disk, a magnetooptic disk, an MO, a CD-ROM, a CD-R, a CD-RW, a magnetic tape, a non-volatile memory card, a ROM, a DVD, or the like can be used.

In this case, the program codes themselves read out from the storing medium realize the functions of the embodiments mentioned above and the storing medium in which the program codes have been stored constructs the invention.

As another program supplying method, the program can be also supplied by a method whereby a client computer is connected to Homepage of the Internet by using a browser of the client computer and the computer program itself of the invention or a compressed file including an automatic installing function is downloaded on a recording medium such as a hard disk or the like. The program supplying method can be also realized by a method whereby the program codes constructing the program of the invention are divided into a plurality of files and each file is downloaded from different Homepage. That is, a WWW server, an ftp server, and the like for downloading a program file to realize the functional processes of the invention by the computer to a plurality of users are also incorporated in Claims of the present invention.

The program supplying method can be also realized by a method whereby the program of the invention is encrypted, stored into a storing medium such as a CD-ROM or the like, distributed to the users, the user who can clear predetermined conditions is allowed to download key information for decrypting the encryption from Homepage through the Internet, and the encrypted program is executed by using the key information and installed into the computer.

Naturally, the invention incorporates not only the case where the computer executes the read-out program codes, so that the functions of the embodiments mentioned above are realized but also the case where the OS (Operating System) or the like which operates on the computer executes a part or all of actual processes on the basis of instructions of the program codes and the functions of the embodiments mentioned above are realized by those processes.

Further, naturally, the invention incorporates the case where the program codes read out from the storing medium are written into a memory provided for a function expanding board inserted in a computer or a function expanding unit connected to the computer, thereafter, a CPU or the like provided for the function expanding board or the function expanding unit executes a part or all of actual processes on the basis of instructions of the program codes and the functions of the embodiments mentioned above are realized by those processes.

The invention is not limited to the above embodiments but many modifications (including organic combinations of the embodiments) are possible on the basis of the essence of the invention and they are not excluded from the scope of the invention.

Although the present invention have been described above with respect to many examples and embodiments, it will be obviously understood by those skilled in the art that the spirit and scope of the invention are not limited to the specific explanation in the present specification.

The present invention is not limited to the foregoing embodiments but many modifications and variations are possible within the spirit and scope of the appended claims of the invention.

Although the embodiments have been described above with respect to the case where the printer driver is attached to the PC (data processing apparatus) and transmitted to one data processing apparatus by E-mail, the printer driver can be also broadcast transmitted to a plurality of addresses.

Further, if the user possesses a cellular phone to which a memory (SD memory) or the like can be attached, it is also possible to construct in such a manner that the printer driver is also transmitted to E-mail addresses (a plurality of addresses) of the cellular phone and even in the situation where the PC itself cannot receive the E-mail, the printer driver transmitted to the memory of the cellular phone by E-mail and its management information can be downloaded on the PC, thereby enabling the installing process of the printer driver to be executed in a manner similar to the foregoing embodiments.

Even in any of the foregoing embodiments, the user who newly used the printer on the network can make preparation for the setup of the necessary driver main body and network information by the simple operation without needing any special knowledge regarding the location information and network information of the printer, image processing apparatus, and other devices, further, the location of the driver, and the like. There is such an effect that a driver installing environment having excellent operability and use convenience which can remarkably reduce a conventional burden of selection and setup of the driver by the user in the conventional system can be freely constructed.

This application claims priority from Japanese Patent Application No. 2003-416979 filed on Dec. 15, 2003, which is hereby incorporated by reference herein.

What is claimed is:

1. An image processing apparatus which can communicate with at least one data processing apparatus through a network and which executes a job requested by the at least one data processing apparatus, said image processing apparatus comprising:
a read unit that reads out information, including a transmission destination on the at least one data processing apparatus on the network, from a tag attached to a separate portable device, wherein the at least one data processing apparatus is different from the portable device;
a storing unit that stores setup information regarding a setup of said image processing apparatus on the network, the setup information including network address information of said image processing apparatus; and
a transmitting unit that
(a) receives (i) the transmission destination on the at least one data processing apparatus read out by said read unit and (ii) the setup information stored in said storing unit, and
(b) transmits the setup information through the network to the at least one data processing apparatus based on the transmission destination,
wherein the at least one data processing apparatus
executes the setup of said image processing apparatus based on the setup information transmitted by said transmitting unit, and
causes said image processing apparatus to execute the requested job via the network based on the network address information included in the setup information.

2. An apparatus according to claim 1,
wherein the setup information includes print setting information, and
said apparatus further comprising a forming unit that forms outgoing information on the basis of the print setting information
wherein said transmitting unit transmits the outgoing information formed by said forming unit to the at least one data processing apparatus.

3. An apparatus according to claim 1,
wherein the information read out by said read unit includes identification information indicative of a type of the portable device to which the tag is attached, and
said apparatus further comprising:
an identifying unit that identifies predetermined identification information from the information which is read out from the tag; and
a display control unit that, when said identifying unit identifies the predetermined identification information, displays a menu which can designate an operation for allowing the at least one data processing apparatus to output the setup information.

4. An apparatus according to claim 3, further comprising a registering unit that registers identification information which is read out from said tag as a condition for displaying said menu,
wherein said display control unit displays the menu in accordance with whether or not the identification information registered by said registering unit has been read out by said read unit.

5. An apparatus according to claim 1, wherein the setup information includes at least one of a driver main body, setting information to a driver, and an installer.

6. An apparatus according to claim 1, wherein the tag is an RFID and the portable device is an ID card with the RFID.

7. An apparatus according to claim 1, wherein the transmission destination is an E-mail address or a storing location on the at least one data processing apparatus.

8. An apparatus according to claim 1,
wherein the requested job is a print job, and
said apparatus further comprising a recording unit that records onto a medium based on the print job which is inputted from the at least one data processing apparatus.

9. A control method for an image processing apparatus which can communicate with at least one data processing apparatus through a network and which executes a job requested by the at least one data processing apparatus, said control method comprising:
a reading step that reads out information, including a transmission destination on the at least one data processing apparatus on the network, from a tag attached to a separate portable device, wherein the at least one data processing apparatus is different from the portable device; and
a transmitting step that
(a) receives the transmission destination on the at least one data processing. apparatus read out in said reading step and that
(b) transmits through the network, from a storing unit to the at least one data processing apparatus based on the received transmission destination, setup information regarding a setup of the image processing apparatus on the network, the setup information including network address information of the image processing apparatus
wherein the at least one data processing apparatus
executes the setup of the image processing apparatus based on the setup information transmitted in said transmitting step and
causes the image processing apparatus to execute the requested job via the network based on the network address information included in the setup information.

10. A method according to claim 9,
wherein the setup information includes print setting information, and
said method further comprising a forming step that forms outgoing information on the basis of the print setting information,
wherein in said transmitting step, the outgoing information formed in said forming step is transmitted to the at least one data processing apparatus.

11. A method according to claim 9, wherein the information read out in said reading step includes identification information indicative of a type of the portable device to which the tag is attached, and
said method further comprising:
an identifying step that identifies predetermined identification information from the information which is read out from the tag; and
a display controlling step that, when said the predetermined identification information is identified in said identifying step, displays a menu which can designate an operation for allowing the at least one data processing apparatus to output the setup information.

12. A method according to claim 11, further comprising a registering step that registers identification information which is read out from the tag as a condition for displaying the menu,
wherein in said display controlling step, the menu is displayed in accordance with whether or not the identification information registered in said registering step has been read out in said reading step.

13. A method according to claim 9, wherein the setup information includes at least one of a driver main body, setting information to a driver, and an installer.

14. A method according to claim 9, wherein the tag is an RFID and the portable device is an ID card with the RFID.

15. A method according to claim 9, wherein the transmission destination is an E-mail address or a storing location on the at least one data processing apparatus.

16. A method according to claim 9,
wherein the requested job is a print job, and
said method further comprising recording onto a medium based on the print job which is inputted from the at least one data processing apparatus.

17. A non-transitory computer-readable storage medium storing a program for controlling a computer to execute a control method in an image processing apparatus which can communicate with at least one data processing apparatus through a network and executes a job which is requested by the at least one data processing apparatus, said method comprising:
a reading step that reads out information, including an output destination on the at least one data processing apparatus on the network, from a tag attached to a separate portable device, wherein the at least one data processing apparatus is different from the portable device; and
a transmitting step that
(a) receives the output destination on the at least one data processing apparatus read out in said reading step and
(b) transmits through the network, from a storing unit to the at least one data processing apparatus based on the received output destination, setup information regarding a setup of the image processing apparatus on the network, the setup information including network address information of the image processing apparatus,
wherein the at least one data processing apparatus
executes the setup of the image processing apparatus based on the setup information transmitted in said transmitting step and
causes the image processing apparatus to execute the requested job via the network based on the network address information included in the setup information.

* * * * *